Aug. 31, 1937. J. REICH 2,091,376
SURFACE TEST INDICATOR
Filed Oct. 4, 1934
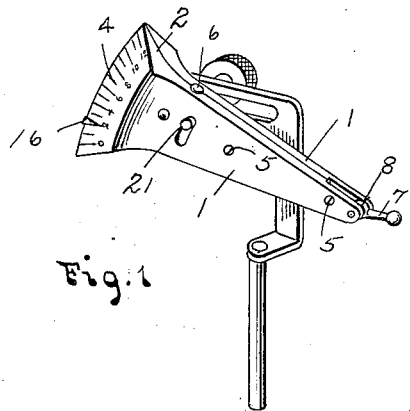
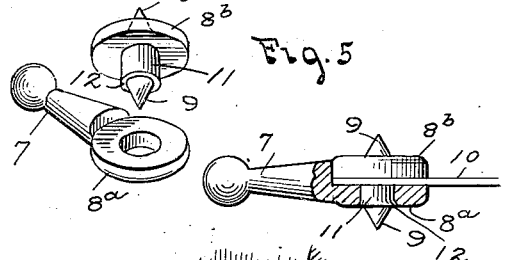
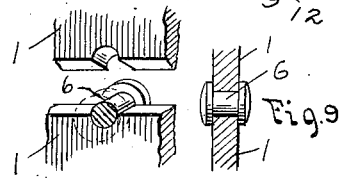
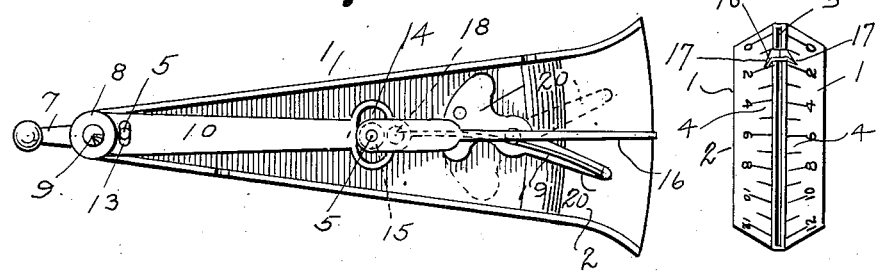
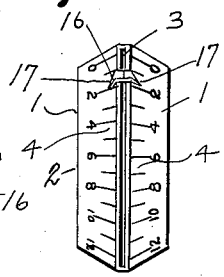
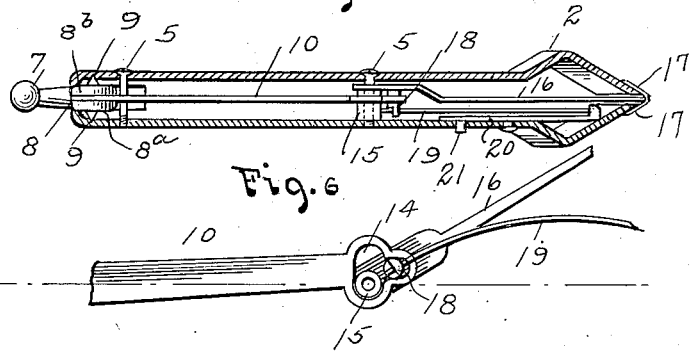
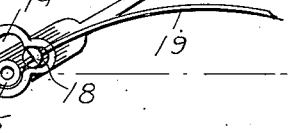
Inventor
Julius Reich
By Walker and Dybvig
Attorney Patented Aug. 31, 1937

2,091,376

UNITED STATES PATENT OFFICE 2,091,376

SURFACE TEST INDICATOR

Julius Reich, Dayton, Ohio

Application October 4, 1934, Serial No. 746,819

19 Claims. (Cl. 33—172)

This invention relates to measuring instruments and more particularly to amplifying gages or surface test indicators for indicating in amplified units of measurement minute irregularities of a work surface relative to which the indicator is moved.

The present invention is an improvement upon and further development of the test indicator construction disclosed in Letters Patent No. 1,436,111 of November 21, 1922.

In the present embodiment of the invention there is contemplated a mounting or housing, from one end of which extends a movable feeler for engagement with the work, which feeler is operatively connected through amplifying mechanism with a movable pointer playing over an angular indicator face at the opposite end of the mounting, which is so disposed as to be easily read from various positions at either side of or aligned with the mounting.

While this general construction is broadly disclosed in the aforementioned Letters Patent, the present improvement involves redesign and rearrangement of parts and operating connection which facilitate manufacture, minimize production costs, and increase sensitivity of the instrument. The field for commercial exploitation of such instrument is such that the solution of manufacturing problems, economies of production, and increased accuracy are equally as important factors as was the development of the fundamental principle of operation disclosed in the former Letters Patent.

The object of the invention therefore is to improve the construction as well as the means and mode of operation of amplifying gages and test indicators or the like whereby they may not only be economically manufactured, but will be more efficient in use, automatic in operation, positive in action, and unlikely to get out of repair.

A further object of the invention is to provide an instrument of relatively small size and compact form, capable of a relatively wide range of operative adjustment, and adapted to afford indications conveniently readable from different positions, thereby obviating the use of a mirror for taking readings in otherwise inaccessible positions with the incidental liability of error.

A further object of the invention is to provide a device which, while of small size and light weight, will be strong and durable and capable of withstanding hard usage, and which will possess ample rigidity to support the operating parts against distortion and undue deflection.

A further and highly important object of the invention is to afford an improved form and arrangement of the parts to facilitate manufacture and assembly of the instrument and whereby it is rendered more sensitive.

A further object of the invention is to provide an improved form of construction and mounting of the contact or feeler member by which its manufacture is greatly facilitated and cost of production minimized.

A further object of the invention is to provide an improved form of reversing adjustment enabling readings to be taken by engagement of the feeler or contact with the work for movement in either direction, and whereby the resistance of the pointer hand may be varied and the sensitiveness of the instrument regulated in accordance with the character of the work.

A further object of the invention is to provide an improved form of feeler mounting and connection thereof with the amplifying lever.

A further object of the invention is to provide a simplified form of main housing which can be more conveniently and economically manufactured and assembled.

A further object of the invention is to improve the shape of the indicator dial to facilitate readings from different positions.

A further object of the invention is to provide a rearrangement of the relation of the pointer and its retracting spring and an improved interconnection thereof to increase the sensitiveness of the instrument and facilitate its manufacture and assembly.

With the above primary and other incidental objects in view, as will more fully appear in the specification, the invention consists of the features of construction, the parts and combinations thereof, and the mode of operation, or their equivalents, as hereinafter described and set forth in the claims.

In the accompanying drawing wherein is illustrated the preferred, but obviously not necessarily the only form of embodiment of the invention, Fig. 1 is a perspective view of the assembled instrument. Fig. 2 is a plan view upon an enlarged scale with one side of the housing or mounting removed. Fig. 3 is a longitudinal sectional view on an enlarged scale of the assembled instrument. Fig. 4 is an enlarged perspective view of the feeler or contact parts. Fig. 5 is a detail sectional view thereof in assembled relation. Fig. 6 is an enlarged detail plan view of the interconnection of the amplifying lever and pointer. Fig. 7 is an enlarged end view of the indicator. Figs. 8 and 9 are enlarged detail views of the frame aligning inserts.

Like parts are indicated by similar characters of reference throughout the several views wherein the instrument is illustrated on a greatly enlarged scale.

To facilitate the manufacture and enable economical production of instruments embodying the present invention, the main frame or housing comprises an acutely sector shaped hollow body symmetrically divided on the median plane thereof into two identical concave side members 1 disposed with their recessed sides together to enclose the working parts. Such symmetrical form of the frame or housing enables the respective portions to be stamped in the same forming dies thus reducing cost of production and facilitating assembly. The sector shaped housing is formed with a prismoidal enlarged head 2 at its wider end. This head is of a substantially "diamond" shape in cross section and curved transversely of the housing concentrically with the center of oscillation of the feeler at the apex of the housing. The sides of the housing are expanded as they approach such head portion and then are abruptly convergent forming relatively sharp laterally projecting angles and approach into closely spaced relation at their margins, affording therebetween a slot 3 for the to and fro play of an indicator hand. The converging faces of the respective housing portions are graduated in units of measurement to afford indicator scales or dials 4 which are easily readable from either side of the instrument or from the end, in which latter event both scales will be exposed to view.

The side members 1 are firmly secured together by clamp screws 5. Before assembly, however, the halves of the housing are adjusted into registry and one or more holes are drilled in each side thereof in the plane of division or coincident with their contacting edges. To securely lock the housing members against relative displacement, tiny spool-like members 6 are placed in the marginal registering notches formed by such drilled holes. The engagement of the inserts 6 in the registering holes locks the members against longitudinal displacement, while the peripheral flanges or heads at opposite ends of such spool-like inserts by overlapping the adjacent side walls of the members both interiorly and exteriorly prevent lateral shifting movement. Such interlocking members may be easily and rapidly turned from small round stock by automatic operation, and are much cheaper to make and easier to assemble than would be dowels or ears upon the respective members. While these parts do not affect the action or function of the moving parts, they are, however, quite advantageous in facilitating manufacture and reducing costs of production which are highly important factors in commercial exploitation of the invention.

Projecting from the apex of the housing 1 is a feeler or contact member 7 for engagement with the work, the minute movement of which is transmitted to the indicator pointer in greatly magnified degree. In the present embodiment of the invention, the feeler is pivoted for oscillatory motion. The feeler is provided with a head 8, from opposite sides of which project conical pivot points 9 seating in corresponding bearings in the opposite sides of the housing. The feeler head is medially intersected by one end of an amplifying lever 10 which may be either fixedly secured to the head of the feeler or it may be frictionally held therein for relative limited pivotal adjustment to different angular relations to the feeler. As an economical way of making this connection, the feeler head is preferably halved, with one half 8a of the head formed integral with the feeler or contact arm 7 and provided with a concentric hole to receive a stud 11. The ends of the stud 11 are conical and comprise the pivotal points 9. Formed integral with the stud 11 is the second half 8b of the feeler head. The end of the amplifying lever 10 which has a hole therein for reception of the stud 11 is clamped between the portions 8a and 8b of the head carried by the stud and the feeler 7 respectively. The stud 11 is formed with a slight shoulder 12 about the base of the conical point 9 which, after the stud has been inserted through the hole in the portion 8a of the head integral with the feeler, is staked or upset by spinning or pressure to thereby rivet the stud and secure the respective portions of the head 8 tightly in place with the amplifying lever 10 clamped therebetween and the pivotal points 9 projecting from its opposite sides. Adjacent to the feeler head the lever 10 has an elongated hole 13 through which one of the body clamp screws 5 extends. The elongation of the hole affords clearance for swinging motion of the arm.

The apex extremity of the housing is bifurcated as shown particularly in Figs. 1 and 3. As also shown in Fig. 3 the screw 5 extends through such bifurcated portions, in the furcations of which are located the bearing seats engaged by the bearing points 9. By adjusting the screw 5 the housing may be tensioned sufficiently to relieve or tighten the bearing engagement of the points 9 within their seats, thereby compensating for wear, or taking up lost motion and insuring extreme accuracy.

At its opposite end the amplifying lever 10 has a trefoil opening 14, the opposite portions of which accommodate an elongated hub 15 of a vibratory pointer arm 16. The pointer is provided with double points 17 projecting through the marginal slot 3 of the housing and reversely bent in opposite direction into overhanging relation with the respective indicator scales 4.

To economically provide the double points 17 the indicator hand is preferably, although not necessarily, made of double thickness with the ends of the respective points reversely bent.

A screw stud extending through the opposite walls of the housing 1 and through the tubular hub 15 serves as a pivot for the indicator hand.

Carried by the indicator hand 16, in proximate relation to the mounting hub 15, is a stud 18 which projects through the intermediate lobe of the trefoil opening 14 engaging therein with the amplifying lever in slightly offset relation with the pivotal axis of the hand. Thus as the lever 10 swings to and fro it imparts like motion to the indicator hand through the stud 18. The extremity of the stud 18 has a transverse hole therein to receive the end of a fine wire spring 19 tensioned to urge the indicator hand and with it the amplifying lever 10 and feeler 7 in one direction or the other, and against the tension of which said parts are oscillated by engagement of the feeler with the work. To facilitate the drilling of the hole in the end of the stud 18 and the subsequent insertion of the spring end, the stud is shouldered or halved at its extremity.

The retracting spring 19 is fixedly secured at its opposite end to an oscillatory arm 20 mounted interiorly of the housing contiguous to the indicating end thereof and extends in reverse direction past the pivotal mounting of the carrying arm and also reversely of the pointer toward the pivotal mounting of the latter where it engages with the stud 18. The connection of the retracting spring with the mounting arm 20 is in offset relation with the pivotal center of the latter so that as the arm 20 is turned to and fro the spring may be more or less strongly tensioned in one direction or the other, and so be made to exert retractive influence on the pointer alternately in reverse directions. A small knob or button 21 on the outer side of the arm 20 and projecting through a corresponding slot in the housing 1 enables the spring tension to be readily reversed to cause the pointer to be retracted toward one or the other ends of the indicator scales.

The structural character of the present indicating gage is such that while the device is extremely sensitive to slight variation of the surface contour operated over, it is of sturdy construction, capable of withstanding hard usage and will give accurate and dependable readings regardless of the relative movement of the gaging contact of the feeler with the work. That is to say, the instrument will give identical readings over a given area when moved in either direction in line with the tool or transversely thereto. Heretofore due to back lash, lost motion and other irregularities, such instruments many times vary their reading over the same surface in accordance with the direction of relative movement, and hence are unreliable.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an amplifying gage of the character described, a substantially sector shaped housing, a prismatic head of increased width and thickness at the larger end thereof including outwardly bulged portions of the opposite side walls of the housing projected beyond the general plane thereof, the terminal faces of which converge in symmetrical angular relation, the base of the included angle thereof being of greater extent than the thickness of the remainder of the housing and having a slot at the vertex of said head, two series of graduations upon converging faces of said prismatic head one of which is visible from each side of the instrument and both of which are visible from the end thereof, a movable contact member projecting from the apex of the housing, and an indicator hand movable in said slot under influence of the movable contact member and coacting with the graduations to indicate variations of movement of the contact member.

2. In an amplifying gage of the character described, a substantially sector-shaped housing, the opposite faces of said housing being expanded through registering localized areas thereby increasing the thickness of the housing adjacent to the wider end thereof, converging terminal faces on said expanded portion of increased depth due to such lateral expansion of the housing, each bearing a series of graduations, said converging graduated faces being separated to afford an intervening slot, a double pointed indicator hand movable in said slot and cooperating with the respective graduated faces, a movable contact member projecting from the apex of the housing and amplifying connections between the contact member and the indicator hand.

3. In an amplifying gage of the character described, a substantially sector-shaped housing including outwardly directed registering lateral ribs on opposite sides thereof affording angularly disposed converging terminal faces having a combined effective depth greater than the thickness of the housing at the wider end thereof, a series of graduations on each of the faces, a pointer hand common to both of said faces, a movable contact projecting from the apex of the housing and an amplifying connection within the housing between the contact member and indicator hand.

4. In an amplifying gage, a substantially sector-shaped housing including V-shaped terminal faces at the broader end thereof extending laterally beyond the planes of the side walls of the housing to afford observation areas of increased depth and disposed symmetrically with the medial plane of the housing, said housing having a slot at the vertex of said V-shaped faces, a series of graduations on each of said faces, an indicator hand common to both faces movable in said slot, a movable contact member projecting from the apex of the housing and an amplifying connection within the housing between the contact member and indicator hand.

5. In an amplifying gage of the character described, a sector-shaped housing comprising separable sections of identical form and size having contacting marginal flanges registering notches in the contacting flanges, locating members positioned in the registering notches and interposed between and straddling the margins of the respective sections insuring registration thereof, means for securing the housing sections together, graduated dial portions on each section, an indicator hand common to the graduated dials, a movable contact member projecting from the apex of the housing, and amplifying means within the housing connecting the contact member with the indicator hand.

6. In an amplifying gage of the character described, a sector-shaped housing comprising separable sections of identical form and size having contacting marginal flanges, the contacting flanges having therein registering notches, a spool-like locating member seated in the registering notches of the respective sections, the heads of which interiorly and exteriorly overlap the flanges adjacent the notches and insure registry of the housing sections, attachment means interconnecting the sections, a graduated dial portion on each section, an indicator hand common to the graduated dials, a movable contact member and an amplifying means within the housing connecting the contact member and pointer for unison motion.

7. In an amplifying gage of the character described, the combination with a housing having a graduated indicator dial portion, an indicator hand cooperating therewith, a pivotally mounted contact member for actuating the pointer hand including a feeler arm, a disc-like head therefor, a cooperating disc-like member, one of said disc-like members having a hole therein, an integral stud formed on the other member engageable through said hole, a trunnion point on said stud and a second trunnion point on the opposite side of the disc-like member in axial alignment with the point on said stud, said points being engageable in seats in the housing, and an amplifying lever clamped between said disc-like members for transmitting motion from the contact member to the pointer.

8. A contact member for a surface test indicator or the like, including a feeler arm, a head therefor divided on a medial plane, one portion of the head being integral with the feeler arm, the other portion being separable therefrom, one of said portions having a hole therein, an integral stud on the other portion insertable through said hole, and adapted to be riveted therein, and axially aligned trunnion points on said stud and on the opposite side of the stud carrying portion.

9. A contact member for a surface test indicator or the like, including a feeler arm, a lever coacting therewith, a head therefor offset to one side of the axial plane of the feeler arm and having a hole therein, a pointed stud, an integral head thereon cooperating with that of the feeler arm head between which the coacting lever is interposed and a corresponding point on the opposite side of said stud head in axial alignment with the stud point, said stud being insertable through the hole in the feeler arm head, and a marginal shoulder surrounding the stud point adapted to be upset to secure the parts together in clamping engagement with the interposed coacting lever.

10. A contact member for a surface test indicator or the like, including a feeler arm, a head therefor divided on a plane parallel with the axis of said arm, integral oppositely disposed trunnion points carried by one-half of said head, the other half of the head having a hole therein through which one of said trunnion points may be projected, said head portions being adapted to be fixedly united in assembled relation.

11. In an amplifying gage of the character described, a housing having thereon a graduated dial portion, a movable pointer hand pivotally mounted within the housing and cooperating with the graduated dial portion, a contact member projecting from the housing, an amplifying lever actuated by the contact member, a spring having one end thereof engaged with the pointer hand and extending in the same general direction as the pointer hand and an adjustable member with which the opposite end of the spring is engaged mounted for to and fro movement past dead center relation with the pointer hand to urge the pointer hand in one direction and then in the other according to the adjustment of said member.

12. In an amplifying gage of the character described, a housing having thereon, a graduated dial portion, a pivotally mounted pointer hand cooperating with the dial portion, a movable contact member, amplifying means within the housing for transmitting motion from the contact member to the pointer hand, a spring against the tension of which the contact member and pointer hand are movable, and a swinging arm upon which the spring is mounted and from which it extends in reverse direction past the pivotal point of the swinging arm into operative connection with said parts.

13. In an amplifying gage of the character described, a housing having thereon a graduated dial portion, a pivotally mounted pointer hand cooperating with the dial portion, a movable contact member, amplifying means within the housing for transmitting motion from the contact member to the pointer hand, a spring member mounted within the housing in proximity to the free end of the pointer hand and extending thence in a direction contrary to that of the pointer hand, one end of which is engaged therewith adjacent to its pivotal point and adjusting means for bodily shifting the end of the spring opposite that engaged with the pointer hand to alternate positions at opposite sides of dead center relation with the pointer hand to accordingly urge the pointer hand in one direction and then in the other according to such adjustment.

14. In an amplifying gage of the character described, a housing having thereon a graduated dial portion, a pivotally mounted pointer hand cooperating with the dial portion, a movable contact member, amplifying means within the housing for transmitting motion from the contact member to the pointer hand, a swinging arm pivoted within the housing intermediate the pivotal point and free end of the pointer hand and extending from its pivotal point in the same general direction as the pointer hand, means for adjusting said arm from the exterior of the housing and a spring wire attached to said arm adjacent the free end thereof and extending in reverse direction into operative engagement with the pointer hand adjacent to the pivotal connection thereof.

15. In an amplifying gage of the character described, a housing having thereon a graduated dial portion, a pivotally mounted pointer hand cooperating with the dial portion, a movable contact member, amplifying means within the housing for transmitting motion from the contact member to the pointer hand, a spring wire against the tension of which the contact member and operated parts are movable, an adjusting member for the spring mounted for to and fro bodily movement to alternate positions at opposite sides of dead center relation with the spring actuated part to alternate the direction of influence of the spring thereon.

16. An indicator of the character described, including a pair of oppositely disposed registering substantially sector-shaped housing side members, a movable contact member at the apex thereof, a movable pointer hand contiguous to the wider ends of the sector-shaped housing members, an amplifying means transmitting motion from the contact member to the pointer hand, the wider end of each section of the sector-shaped housing being doubly beveled the apex of the beveled area being extended beyond the general plane of the corresponding sector-shaped housing member, each of the sector-shaped housing members bearing a graduated scale upon its beveled face to which the pointer hand is common to simultaneously indicate thereon like variations of measurement, said indications being visible from either side and from beyond the end of the instrument.

17. A contact member for a test indicator or the like, including a feeler arm, a head therefor separable substantially upon the axial plane of the feeler arm into two disc-like portions, one of which is integral with said arm and the other independent thereof, a central stud formed integral with one of the head portions and insertable through a central hole in the other head portion, said stud being adapted to secure said portions together, a trunnion bearing upon the end of the stud, and a second trunnion bearing upon the opposite side of the stud carrying head portion in axial alignment with that upon the stud.

18. A housing element for an indicator mechanism, comprising a sector shaped channel member, the outer face of which adjacent to its wider end is distended into a doubly beveled prismatic ridge transversely of the member with its apex projected beyond the general plane of the member, and a series of graduations upon the exterior inclined face of such ridge contiguous to the end of the member.

19. A housing for an amplifying gage comprising two sector-shaped marginally flanged members engaged with each other in reversely disposed relation with their recessed sides contiguous and their flanges in marginally abutting relation whereby the housing is separable on a medial plane, bearings for operating parts carried thereby and means for fixedly connecting the housing members one with the other.

JULIUS REICH.